United States Patent
Huang et al.

(10) Patent No.: US 12,130,210 B1
(45) Date of Patent: Oct. 29, 2024

(54) GEOTECHNICAL CENTRIFUGE PLATFORM-BASED EARTHQUAKE FAULT SIMULATION SYSTEM

(71) Applicant: Tongji University, Shanghai (CN)

(72) Inventors: Yu Huang, Shanghai (CN); Zhiyi Chen, Shanghai (CN); Chongqiang Zhu, Shanghai (CN); Zhiming Peng, Shanghai (CN); Yunqiu Zhang, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 18/745,907

(22) Filed: Jun. 17, 2024

(30) Foreign Application Priority Data

Sep. 18, 2023 (CN) .......................... 2023112005575

(51) Int. Cl.
 *G01M 7/02* (2006.01)
(52) U.S. Cl.
 CPC .................................... *G01M 7/02* (2013.01)
(58) Field of Classification Search
 CPC ........ G01M 7/02; G01M 7/022; G01M 7/025; G01M 7/06; G01M 7/08; G01M 7/00
 See application file for complete search history.

(56) References Cited

U.S. PATENT DOCUMENTS

2021/0026027 A1* 1/2021 Zhang ...................... G01V 1/36

FOREIGN PATENT DOCUMENTS

CN 105606328 A * 5/2016 ............... G01N 7/06

OTHER PUBLICATIONS

China National Intellectual Property Administration. Notice of Grant of Invention Patent Right of foreign counterpart 2023112005575. Dec. 19, 2023.

* cited by examiner

*Primary Examiner* — Suman K Nath
(74) *Attorney, Agent, or Firm* — Hawaii Patent Services; Nathaniel K. Fedde; Kenton N. Fedde (57) ABSTRACT

The present invention provides a geotechnical centrifuge platform-based earthquake fault simulation system, involving the field of earthquake disaster simulation technology. A bottom support system of the geotechnical centrifuge platform-based earthquake fault simulation system is used to support a horizontal actuation system and simulate earthquake faults and site covering layers. The horizontal actuation system is used to apply horizontal thrusts to simulated earthquake faults and site covering layers. The simulated earthquake faults are used to fill fault test blocks to simulate bedrock layers of earthquake faults and the site covering layers are used to fill sand layer materials onto surfaces of the simulated earthquake faults to simulate soil layers of the earthquake faults.

10 Claims, 9 Drawing Sheets

GEOTECHNICAL CENTRIFUGE PLATFORM-BASED EARTHQUAKE FAULT SIMULATION SYSTEM

INCORPORATION BY REFERENCE

This application claims the benefit of priority from China Patent Application No. 2023112005575 filed on Sep. 18 2023, the contents of which are hereby incorporated by reference in their entirety.

TECHNICAL FIELD

The present invention relates to the technical field of seismic disaster simulation, in particular to a geotechnical centrifuge platform-based earthquake fault simulation system.

BACKGROUND TECHNOLOGY

In recent years, with the shift of the geographical focus of basic infrastructure construction among China's economic development, a large number of major projects (such as the Qinghai-Tibet Railway, Sichuan-Tibet Railway, West-East Gas Pipeline, etc.) have been deployed and constructed in the earthquake active zones of southwestern China. However, the extremely complex and widespread distribution of active fault structures in southwestern regions of China poses challenges, major projects cannot avoid these active fault zones, thus threatening the construction safety of such projects. There is an urgent need to conduct cutting-edge research on engineering structures crossing fault directions, which holds significant scientific value and promising engineering application prospects.

Soil and rock materials exhibit typical nonlinear mechanical behaviors and are significantly influenced by stress states. Physical model tests, as the most commonly used and effective research method, are widely applied in earthquake disaster studies. Nevertheless, conventional physical model tests often use scaled models and are conducted under normal gravity conditions, which cannot accurately reproduce the original stress state of soil and rock materials, significantly constraining the scientific validity and engineering applicability of research findings. Furthermore, current earthquake disaster studies mostly utilize bottom vibration tables to apply uniform earthquake motions and assess earthquake effects through observing dynamic responses of sites or engineering structures. This method is suitable for studying scenarios far from faults but is not applicable for evaluating the earthquake performance of engineering structures crossing faults. Lastly, the key to earthquake safety assessment of engineering sites or evaluation of the earthquake performance of engineering structures lies in obtaining reasonable ground motion records. Although various methods for synthesizing ground motions based on measured earthquake records have been proposed internationally, such models cannot entirely reflect future potential earthquake motion cases. The root cause of this issue is the lack of physical simulation research on the earthquake generation mechanism and propagation path effects, severely constraining the prediction of future ground motions. In summary, with regard to the strategic needs of western China's development, current physical model tests have following shortcomings when earthquakes involving fault crossing are researched:

Firstly, conventional scaled model tests under normal gravity cannot reflect actual stress states of soil and rock materials. The stress levels in scaled model tests are significantly lower than those in the actual states while the mechanical behaviors of soil and rock materials depend on the stress states, which therefore severely limits the engineering applicability and scientific validity of research findings in this field.

Secondly, the vibration method used in bottom vibration table tests cannot simulate scenarios where engineering structures cross faults. Currently, model tests often apply uniform earthquake motions to entire models through bottom vibration tables, which is unable to simulate the impact of fault movement on engineering structures when crossing faults.

Thirdly, the site ground motion synthesis models fail to consider the effects of earthquake source mechanisms and propagation paths. Current ground motion synthesis models are mostly based on analyzed actual earthquake records, unable to account for earthquake source mechanisms and propagation path effects, resulting in an inaccurate and incomplete reflection of future ground motion occurrences at sites.

Therefore, there is an urgent need to develop a large-scale model test system that accurately reproduces true stress states of soil and rock materials and precisely simulates various fault rupture processes and site propagation effects, thus providing a scientific basis for evaluating the earthquake performance of engineering structures crossing faults and synthesizing ground motions at sites.

SUMMARY OF THE INVENTION

The present invention aims to provide a geotechnical centrifuge platform-based earthquake fault simulation system, which simulates hyper gravity environment through a geotechnical centrifuge platform and faithfully reproduces real stress states of rock and soil, while simulating the entire process of earthquake generation caused by active fault rupture and propagation effects of earthquakes in the site by setting up simulated earthquake faults and site covering layers and applying thrusts to the same through a horizontal actuation system, thereby achieving the simulation of dynamic response characteristics of engineering structures under the scenario of crossing faults.

In order to achieve the above purposes, the present invention provides a geotechnical centrifuge platform-based earthquake fault simulation system, comprising a model box placed on a geotechnical centrifuge platform, wherein inside the model box comprises an accommodation space, the accommodation space is provided with a bottom support system, simulated earthquake faults and site covering layers from bottom to top, and on a side of the simulated earthquake faults and the site covering layers is provided a horizontal actuation system;

the bottom support system is used to support the horizontal actuation system, and the simulated earthquake faults and the site covering layers;

the horizontal actuation system is used to apply horizontal thrusts to the simulated earthquake faults and the site covering layers;

the simulated earthquake faults are used to fill fault test blocks to simulate bedrock layers of earthquake faults; and the site covering layers are used to fill sand layer materials onto surfaces of the simulated earthquake faults to simulate soil layers of the earthquake faults.

In an embodiment, the model box comprises two side plates, a bottom plate and a back plate, which form a box body with a top surface remaining open, and a front side of the model box is provided with a transparent glass panel; and the top surface of the model box is detachably installed with pull rod systems, and the pull rod systems are used to hoist the model box and restrict deformation of the box body.

In an embodiment, the bottom support system comprises rigid supports, elastic supports, lifter stands and motor mounts;

the rigid supports are used to support footwalls of the simulated earthquake faults;

the elastic supports are used to support hanging walls of the simulated earthquake faults;

the lifter stands are used to support screw lifting devices in the horizontal actuation system; and the motor mounts are used to support stepper motors in the horizontal actuation system.

In an embodiment, horizontal actuation system comprises screw lifting devices, right-angle reducers, and stepper motors;

the screw lifting devices are used to apply horizontal thrusts to the simulated earthquake faults and the site covering layers;

the stepper motors are used to control the screw lifting devices to generate horizontal motion; and the right-angle reducers are used to decelerate screw rods rotating in the screw lifting devices.

In an embodiment, the screw lifting devices are horizontally provided with contact panels, loading panels, spoke sensors, flanges, screw rods, rotating shafts and lifters in sequence;

the contact panels and the loading panels are connected by bolts, the loading panels and the spoke sensors are connected by dowel pins, and the spoke sensors and the flanges are connected by bolts; and the lifters drive the rotating shafts and the screw rods to produce horizontal thrusts, and the horizontal thrusts propel the simulated earthquake faults or the site covering layers in contact with the contact panels.

In an embodiment, in the site covering layers are provided tunnels and the tunnels horizontally penetrate the site covering layers.

In an embodiment, the geotechnical centrifuge platform-based earthquake fault simulation system further comprises stereoscopic monitoring systems, wherein the stereoscopic monitoring systems comprise laser displacement meters, accelerometers, soil pressure cells and strain gauges;

the laser displacement meters are placed on the pull rod systems of the model box to monitor horizontal and vertical displacements of the site covering layers;

the accelerometers and soil pressure cells are respectively placed in the sand layer materials near the tunnels to monitor acceleration and soil pressure of the sand layer materials; and the strain gauges are placed on arch top portions and arch bottom portions of the tunnels to monitor strain of the arch top portions and the arch bottom portions of the tunnels.

In an embodiment, the stereoscopic monitoring systems further comprise high-speed cameras, and the high-speed cameras are arranged on the geotechnical centrifuge platform and face the front side of the model box.

In an embodiment, the screw lifting devices further comprise travel limiters, and the travel limiters are arranged on surfaces of the lifters facing the flanges.

In an embodiment, the simulated earthquake faults are in contact with one of the side plates of the model box, and between the simulated earthquake faults and the one of the side plates are arranged damping layers for shock absorption.

SPECIFIC EMBODIMENTS

The following will be described in detail with reference to accompanying drawings to provide a clearer understanding of purpose, features and advantages of the present invention. It should be understood that embodiments shown in the accompanying drawings are not intended to limit the scope of the present invention, but are only intended to illustrate the essential spirit of technical solutions of the present invention.

In following description, certain specific details are set forth for the purpose of illustrating various disclosed embodiments to provide a thorough understanding of various disclosed embodiments. However, those skilled in the relevant art will recognize that the embodiments may be practiced without one or more of these specific details. In other cases, well-known devices, structures, and techniques associated with the present invention may not be shown or described in detail to avoid unnecessarily obscuring the description of the embodiments.

Unless the context requires otherwise, throughout the specification and claims, the word "comprise" and variations such as "comprises" and "comprising" should be construed as comprising an open, inclusive meaning, that is, should be interpreted as "including, but not limited to".

References throughout the specification to "one embodiment" or "an embodiment" mean that a particular feature, structure, or characteristic described in connection with the embodiment is included in at least one embodiment. Thus, the appearance of "in one embodiment" or "in an embodiment" in various places throughout the specification are not necessarily all referring to the same embodiment. Furthermore, particular features, structures, or characteristics may be combined in any manner in one or more embodiments.

As used in this specification and the appended claims, the singular forms "a," "an," and "the" include plural referents unless the context clearly dictates otherwise. It should be noted that the term "or" is generally employed in its sense including "or/and" unless the context clearly dictates otherwise.

In following description, in order to clearly show the structure and working mode of the present invention, many directional words will be used for description, but words such as "front", "back", "left", "right", "outside", "inside", "outward", "inward", "up", and "down" should be understood as convenient terms and should not be understood as restrictive terms.

Figure 1:
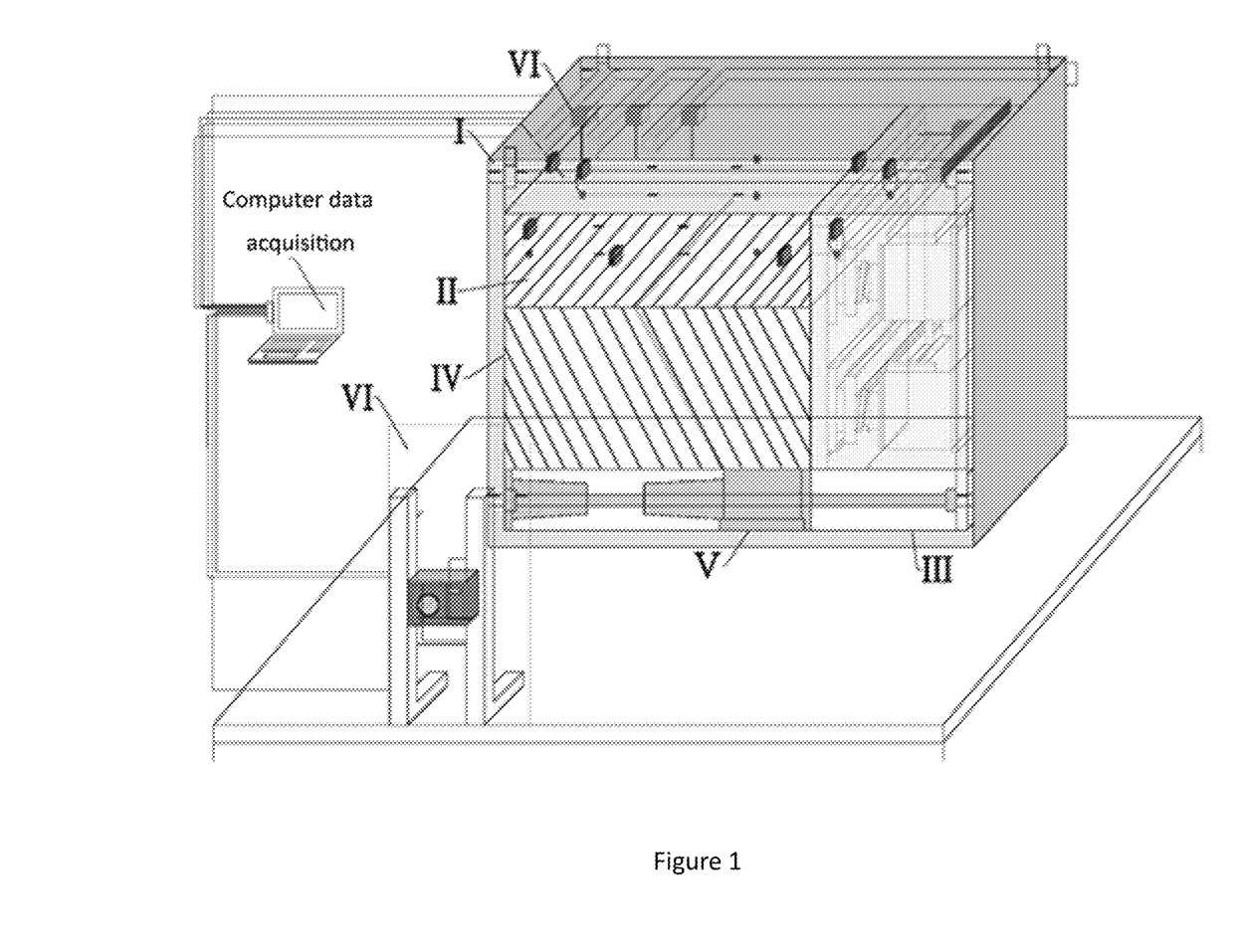
FIG. 1 is a schematic diagram of overall partition of a geotechnical centrifuge platform-based earthquake fault simulation system according to the present invention.
Figure 4:
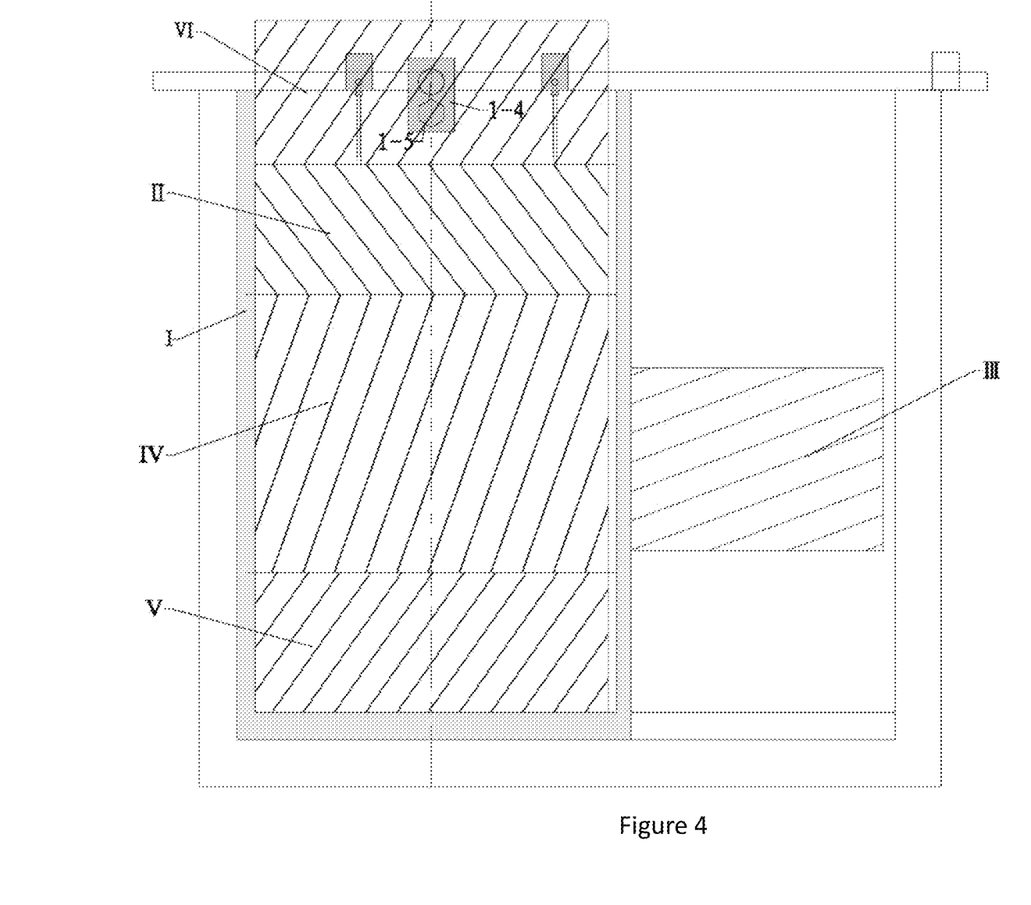
FIG. 4 is a side view of the overall partition of the geotechnical centrifuge platform-based earthquake fault simulation system according to the present invention.

A first embodiment of the present invention relates to a geotechnical centrifuge platform-based earthquake fault simulation system, which can simulate the entire earthquake process, propagation path effects, and the complex interaction between fault displacement and engineering structures under real stress states of faults, as shown in FIGS. 1 and 4, comprising a model box I placed on a geotechnical centrifuge platform 7-10, wherein inside the model box I comprises an accommodation space, the accommodation space is provided with a bottom support system V, simulated earthquake faults IV and site covering layers II from bottom to top, and on a side of the simulated earthquake faults IV and the site covering layers II is provided a horizontal actuation system III; the bottom support system V is used to support the horizontal actuation system III, and the simulated earthquake faults IV and the site covering layers II; the horizontal actuation system III is used to apply horizontal thrusts to the simulated earthquake faults IV and the site covering layers II; the simulated earthquake faults IV are used to fill fault test blocks to simulate bedrock layers of earthquake faults; and the site covering layers II are used to fill sand layer materials onto surfaces of the simulated earthquake faults IV to simulate soil layers of the earthquake faults. Therefore, in the present embodiment, based on the development of a large-scale geotechnical centrifuge test platform, the centrifuge simulates hyper gravity, accurately reproducing true stress states of soil and rock, laying a solid foundation for such model test research. Through the settings of the simulated earthquake faults and the site covering layers, under the precise control of a horizontal actuator, the entire earthquake process caused by active fault rupture and propagation effects thereof in sites are simulated, thus laying the foundation for research considering earthquake source mechanisms and propagation path effects in ground motion synthesis models. Furthermore, by directly setting simulated earthquake faults under engineering structures and controlling fault rupture modes, complex earthquake conditions are achieved, limitations of traditional methods that could only apply uniform earthquake motions through bottom vibration tables are overcame, and dynamic response characteristics of engineering structures when crossing faults are truly reproduced.

Figure 2:
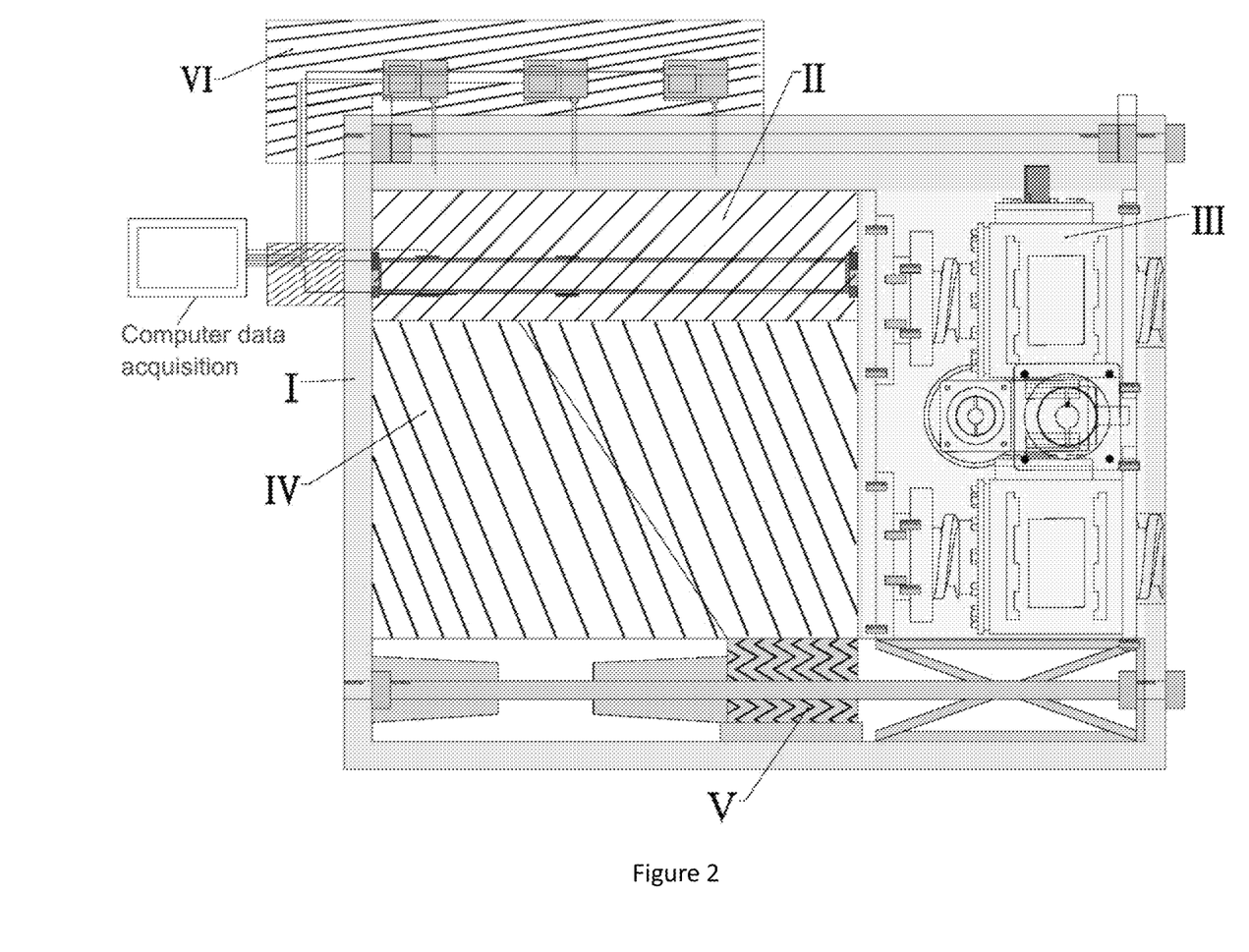
FIG. 2 is a front view of the overall partition of the geotechnical centrifuge platform-based earthquake fault simulation system according to the present invention.
Figure 3:
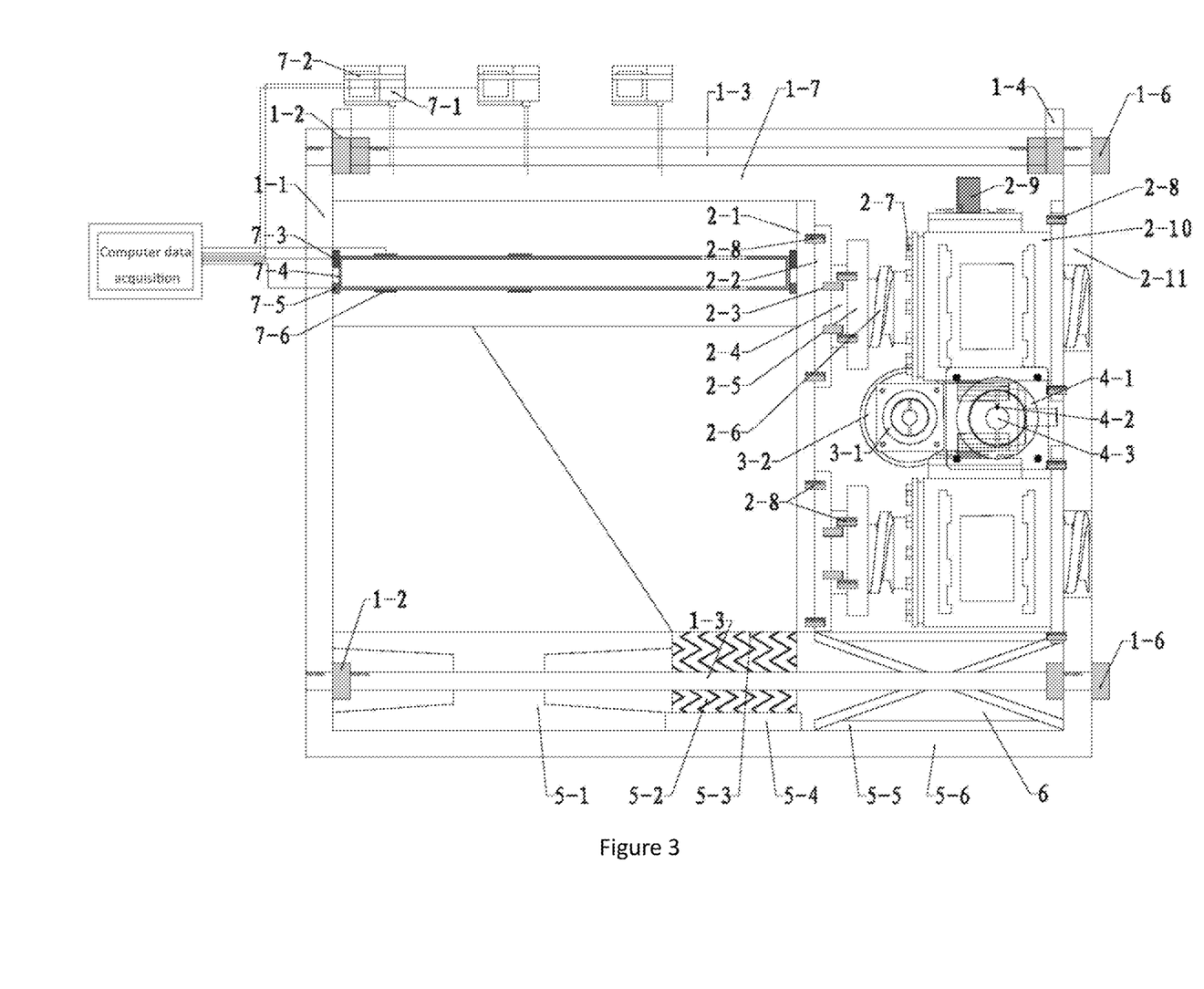
FIG. 3 is a schematic diagram of an overall front view of components in the geotechnical centrifuge platform-based earthquake fault simulation system according to the present invention.
Figure 5:
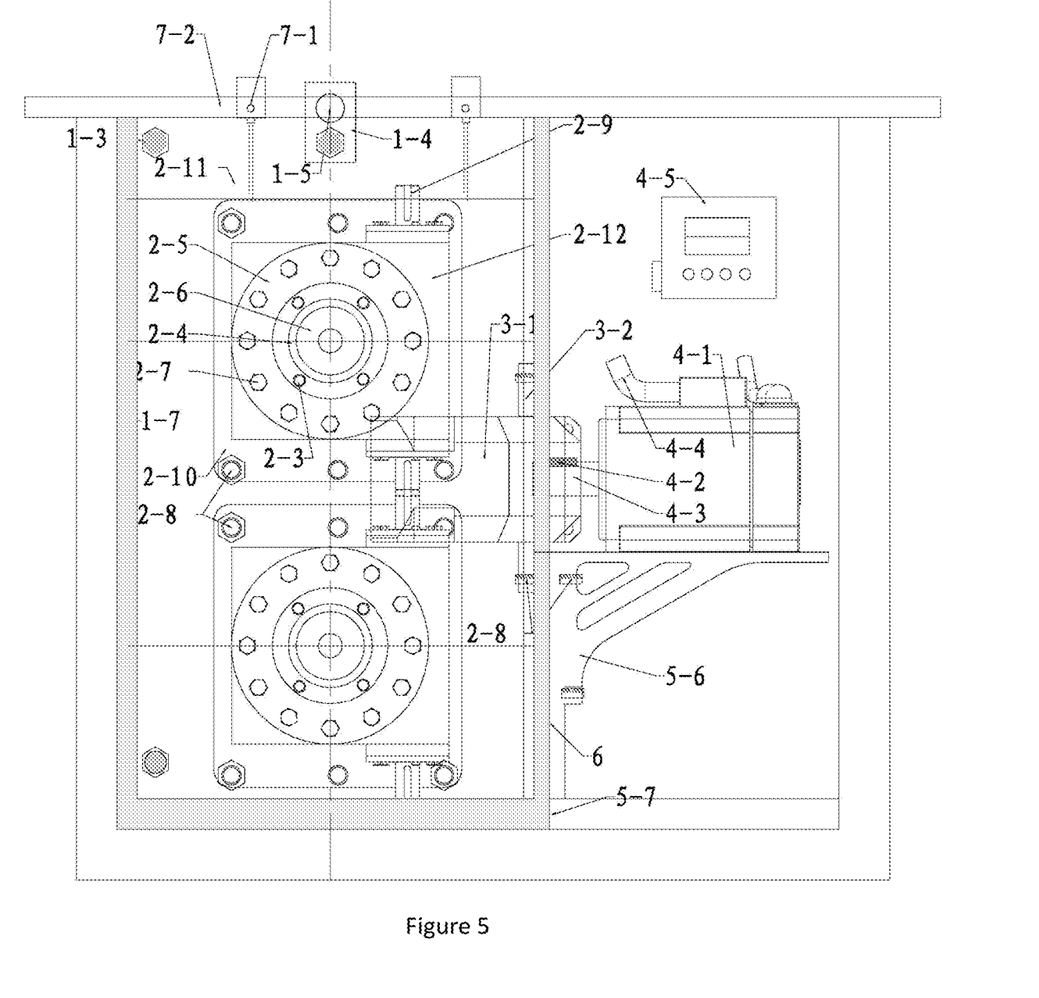
FIG. 5 is a schematic diagram of an overall side view of components in the geotechnical centrifuge platform-based earthquake fault simulation system according to the present invention.
Figure 7:
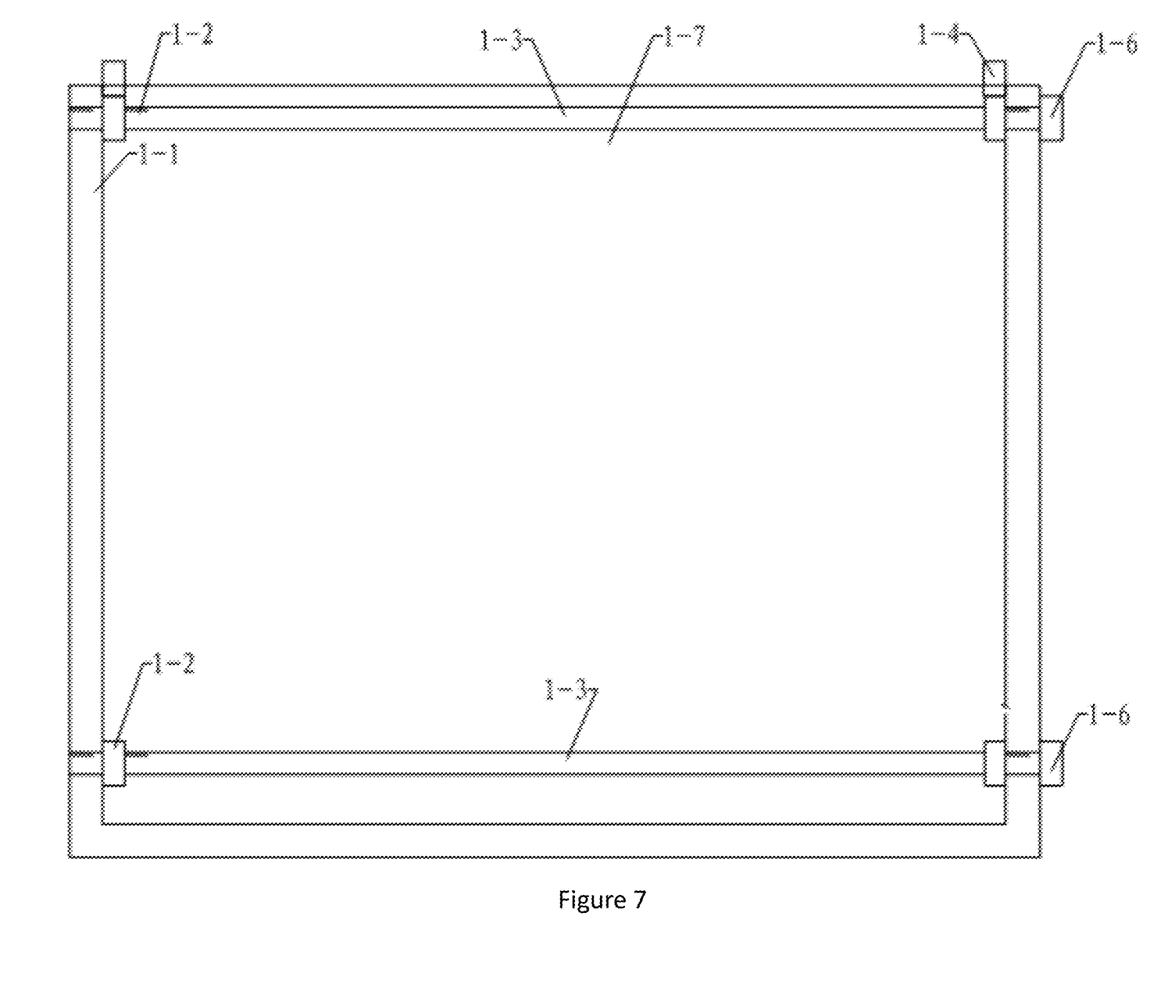
FIG. 7 shows a top surface of a model box in the geotechnical centrifuge platform-based earthquake fault simulation system according to the present invention.

The model box I mainly comprises an external rigid model box I, which not only provides horizontal reactive support for the horizontal actuation system III, but also facilitates hoisting by installing lifting rings. As shown in FIGS. 2, 3, and 5, the model box I comprises two side plates (a left side plate 1-1 and a right side plate 2-11), a bottom plate 5-7, and a back plate 6, which are four thick steel plates rigidly connected and form a box body with a top surface remaining open, and the two side plates, the bottom plate 5-7 and the back plate 6 are plates made of steel; a front side of the model box I is provided with a transparent glass panel; and the top surface of the model box I is detachably installed with pull rod systems, the pull rod systems are used to hoist the model box I and restrict deformation of the box body I, the top surface is a top free surface, and multi-point connection is achieved through the pull rod systems, so as to overcome the deficiency of tensile torque due to the concentration of connection points on the steel plates. As shown in FIG. 7, the pull rod systems of model box I comprise threaded pull rods 1-3, limit bolts 1-2, and reaction bolts 1-6, which are installed on top and front free surfaces of the model box I. The threaded pull rods 1-3 are installed by opening internal threaded holes in the left side plate 1-1, and the internal threaded holes are connected with the threaded pull rods 1-3; the right side plate 2-11 is provided with holes slightly larger than a diameter of threads, and the reaction bolts 1-6 is tightened to provide reactive forces. The pull rod systems are detachable, which improves the convenience of filling samples. Pull rods at top middle positions comprise two hoisting plates 1-4, which are used to connect with lifting rings of a centrifuge chamber crane, so as to lift the model box I entirely into a rigid box inside a centrifuge.

It is important to note that in order to control internal forces and deformations of steel components in different deformation stages, connection forms of the steel plates of the box body are determined according to stress conditions. The side plates and the bottom plates are connected by using a combination of bolts and double-sided welding, while the bottom plate and back plate, as well as the side plates and back plate, use a combination of bolts and single-sided welding for connection.

Figure 6:
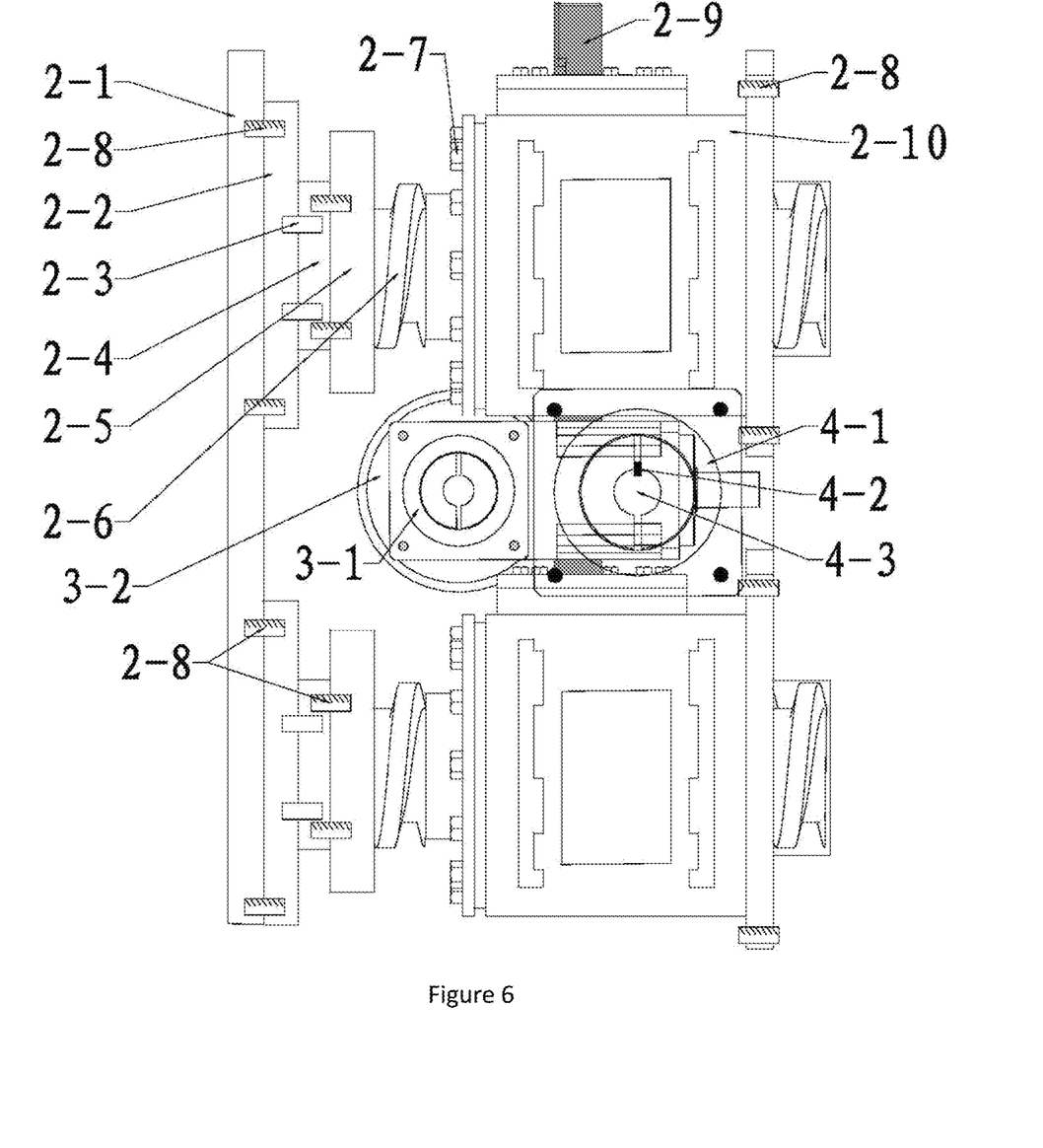
FIG. 6 is a schematic diagram of a horizontal actuation system in the geotechnical centrifuge platform-based earthquake fault simulation system according to the present invention.

The horizontal actuation system III is located on a right side of the system in the present embodiment, so as to apply different horizontal thrusts accurately to faults to precisely control the faults' cyclic reciprocating motions in the horizontal direction. The horizontal actuation system III comprises screw lifting devices 2-10, right-angle reducers 3-1, stepper motors 4-1, and actuation control boxes 4-5. The screw lifting devices 2-10 are used to apply horizontal thrusts to the simulated earthquake faults IV and the site covering layers II. The stepper motors 4-1 are connected to the actuation control boxes 4-5 via wires to control horizontal motions generated by the screw lifting devices 2-10. The stepper motors 4-1 are connected to the right-angle reducers 3-1 via the rotating shafts 4-3, which are used to decelerate the screw rods 2-6 rotating in the screw lifting devices 2-10. When the power of the stepper motors 4-1 remains constant, the right-angle reducers 3-1 increase horizontal thrusts by reducing speed and increasing torque. The right-angle reducers 3-1 are connected to upper and lower two horizontal pushers' screw rods 2-6 through gears, so as to drive the screw rods 2-6 to make controlled horizontal motions. The screw rods 2-3 are connected to spoke sensors 2-4 and contact panels 2-1, all three being combined by threaded connection with pins. The spoke sensors 2-4 obtain real-time thrust values, and are connected to the actuation control boxes 4-5 via wires to provide control signals for stress control experiments.

As shown in FIGS. 5 and 6, the screw lifting devices 2-10 are horizontally provided with contact panels 2-1, loading panels 2-2, spoke sensors 2-4, flanges 2-5, screw rods 2-6, rotating shafts 2-9, travel limiters 2-7 and lifters 2-10 in sequence. The contact panels 2-1 directly contact simulated faults to control movement thereof. Sides of the contact panels 2-1 and the loading panels 2-2 are connected by bolts 2-8, while another sides thereof tightly contact the simulated earthquake faults IV and the site covering layers II. The loading panels 2-2 and the spoke sensors 2-4 are connected by dowel pins 2-3, and the spoke sensors 2-4 and the flanges 2-5 are connected by bolts 2-8. Centers of the spoke sensors 2-4 are provided with internal threads, the internal threads have force sensing capabilities. Holes are drilled on outer edges of the spoke sensors 2-4 without force measurement function and corresponding positions on the loading panels 2-2 for easy installation of pins 2-3. The loading panels 2-2 and the spoke sensors 2-4 are connected by the internal threads and the pins 2-3, respectively, wherein pin combination provides shear strength only, not tensile or compressive strength, ensuring that all actuating forces sensed by sensors are borne by internal threaded contact. Grooves are made on contact sides of the flanges 2-5 and the spoke sensors 2-4, and sensors are placed in the grooves. Holes are drilled on outer edges of the spoke sensors 2-4 without force measurement function and corresponding positions on the flanges 2-5, which are provided with internal threads, and are connected by bolt combinations. The flanges 2-5 and the screw rods 2-6 form integral fixed structures. The screw rods 2-6 and bases of the lifters 2-10 form integrated mechanical devices, and the screw rods 2-6 only perform lifting during operation, with sufficiently long connection to the bases.

The bases of the lifters 2-10 and the right-angle reducers 3-1, the stepper motors 4-1 are integrated into whole units through the rotating shafts 2-9 and connectors, fixed on the side plates and back plate through connecting disks 3-2 and dowel pins 2-3. The whole units are located on a right side, significantly optimizing space utilization efficiency, wherein the lifters 2-10 drive the rotating shafts 2-9 and the screw rods 2-6 to produce horizontal thrusts, and the horizontal thrusts drive the contact panels 2-1 in contact with the simulated earthquake faults IV or the site covering layers II. The travel limiters 2-7 are set on surfaces of the lifters 2-10 facing the flanges 2-5, limiting horizontal movement of the lifters 2-10, when the travel limiters 2-7 touch the flanges 2-5, the horizontal movement of lifters 2-10 are stopped. For example, the flanges 2-4 are set near the stepper motors 4-1 on sides of the spoke sensors 2-4, when the flanges 2-4 contact the travel limiters 2-7, power of the stepper motors 4-1 is automatically cut off, and the horizontal movement is stopped to ensure the safety of the test system.

Specifically, the contact panels 2-1 control overall horizontal actuation displacement to be consistent. The loading panels 2-2 are connected to the spoke sensors 2-4 through a combination of dowel pins 2-3 and internal threads, providing normal stiffness for precise feedback of horizontal thrusts. By controlling number and frequency of pulses of the stepper motors 4-1, actuation force and speed are precisely controlled to achieve accurate positioning and speed regulation. After reducing rotation speed through the right-angle reducers 3-1, high actuation capability at lower speeds of the screw rods 2-6 is achieved. Combined with force feedback from the spoke sensors 2-4, the working status of the horizontal actuation system III can be obtained, and the actuation speed can be adjusted in a main control room of the centrifuge through the control boxes 4-5. When bottom portions of the flanges 2-5 touch the travel limiters 2-6, the control boxes 4-5 automatically stop the stepper motors 4-1, achieving precise control of actuation stroke of the screw rods 2-6 and avoiding contact with the side plates of the model box I made of aluminum alloy in the centrifuge.

Figure 8:
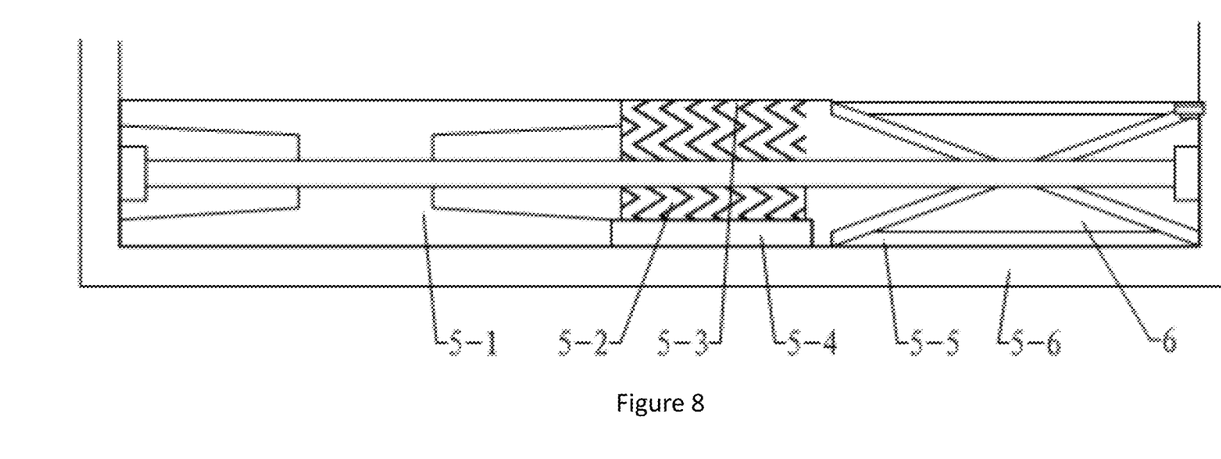
FIG. 8 is a schematic diagram of a bottom support system in the geotechnical centrifuge platform-based earthquake fault simulation system according to the present invention.

The bottom support system V mainly comprises rigid supports made of aluminum, spring supports made of steel and rigid lifters stands. The rigid supports place specimens at a relatively fixed height, while the spring supports provide movement space for the specimens. The lifters stands fix positions of horizontal actuation points, allowing screw lifters to approach the reaction force maximally, thereby maximizing the actuation capability. That is, the bottom support system V comprises rigid supports, elastic supports, lifter stands, and motor mounts. The rigid supports are used to support footwalls of the simulated earthquake faults IV, the elastic supports are used to support hanging walls of the simulated earthquake faults IV, the lifter stands are used to support the screw lifting devices in the horizontal actuation system III, and the motor mounts are used to support the stepper motors in the horizontal actuation system III. The supports and lifter stands of the bottom support system V are connected by bolts and steel plates, with rear side portions tightly against the back plate, leaving gaps on a front side and an organic glass panel side for installing threaded pull rods. The bottom support system V can reduce the impact effect during testing and accurately adjust vertical positions of faults. As shown in FIGS. 5 and 8, the bottom support system V comprises rigid supports 5-1 made of aluminum, spring supports 5-2 made of steel, shock-absorbing rubber pads 5-3, supporting pads 5-4, lifter stands 5-5, motor mounts 5-6, and the bottom plate 5-7. The rigid supports 5-1 made of aluminum are used to support footwalls of the faults; the spring supports 5-2 made of steel are used to support hanging walls of the faults and allow movement within a certain range; the lifter stands 5-5 are used to support horizontal actuation devices; the bottom plate 5-7 is used to support an entire weight of the horizontal actuator. Specifically, bottom portions of the horizontal actuation system III are provided with the lifter stands 5-5, and by adjusting the screw height of the lifter stands 5-5, the height of the system can be changed, thereby adjusting the horizontal actuation system III. Correspondingly, by adjusting the height of the rigid supports 5-1 at bottom portions of footwalls of the simulated earthquake faults IV, the height thereof is coordinated with the height of the horizontal actuation system III; bottom portions of the hanging walls of the simulated earthquake faults IV are provided with the spring supports 5-2 made of steel, which can adaptively adjust the height of the hanging walls to coordinate with the height of the horizontal actuation system III.

In regions of site covering layers II and simulated earthquake faults IV, different materials and types of the specimens can be filled to investigate fracture, frictional excitation strength, and rupture patterns of various geological materials. Specifically, the site covering layers II can be made by using rock-soil similar materials that meet design requirements for similarity. By controlling thickness and composition, different terrains can be simulated. The simulated earthquake faults IV can be constructed by using blocks of different materials, inclinations, orientations, surface roughness, etc., to accurately simulate various active faults. Rubber pad layers are placed on contact surfaces between the model box I and the simulated earthquake faults IV to achieve damping and filtering, effectively reducing collision vibrations between the specimens and the setup during testing, thereby reducing experimental errors. In some cases, adhesive is used on contact sides of the rubber pad layers and the box body, while petroleum jelly is applied to contact sides of the specimens to reduce friction.

In the site covering layers II are provided tunnels, and the tunnels horizontally penetrate the site cover layers II. In the present embodiment, the simulated earthquake faults IV are constructed by using cement mortar, and the site covering layers II are filled with sand according to ISO standards, within which there are different types of tunnel structures, all running across the direction of the faults.

Figure 9:
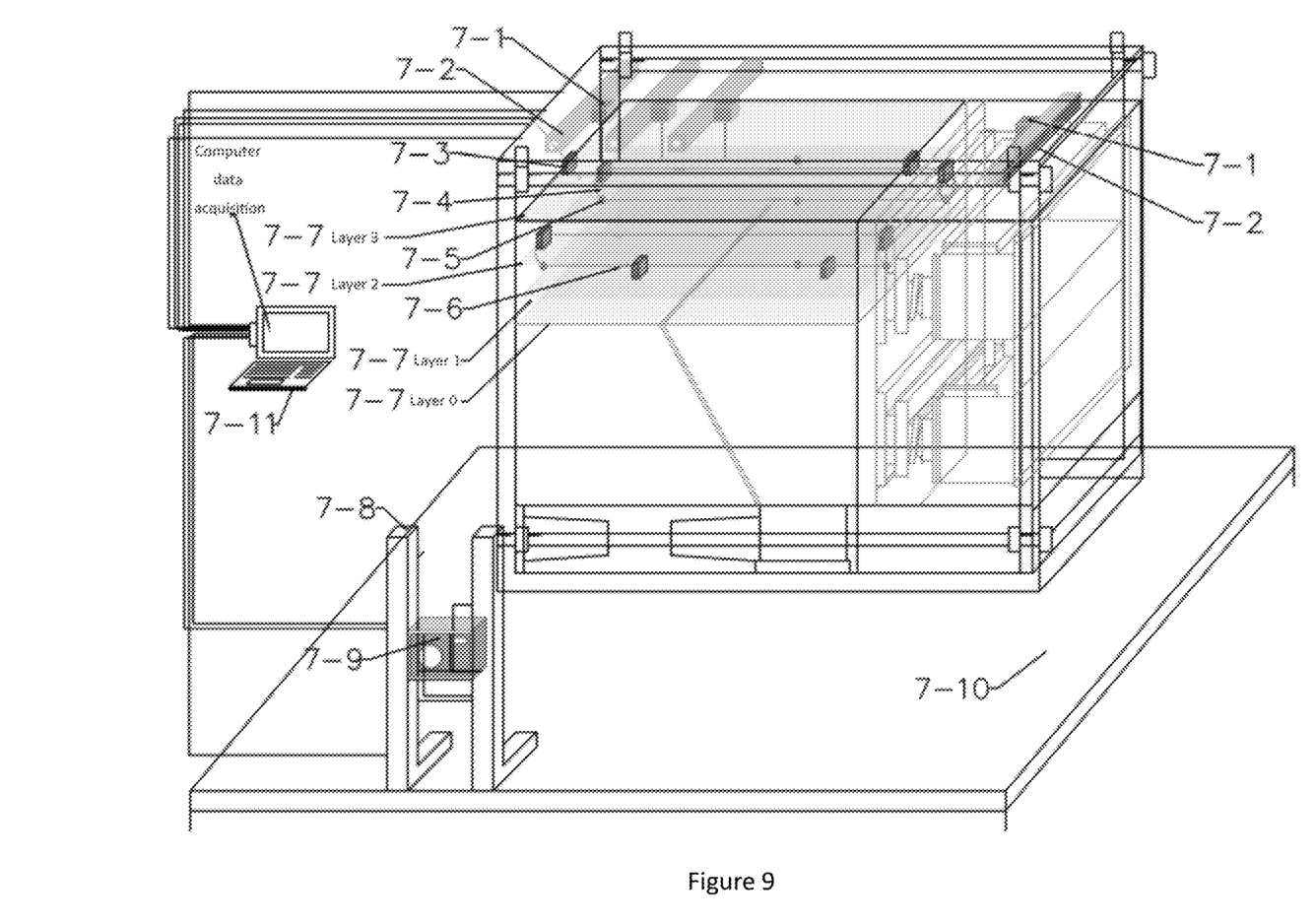
FIG. 9 is a schematic diagram of an overall geotechnical centrifuge platform-based earthquake fault simulation system according to the present invention.

Comprehensive stereoscopic monitoring systems VI are further arranged, comprising high-speed cameras, acceleration sensors, soil pressure sensors, displacement sensors, spoke sensors, strain gauges, etc., and are remotely connected to a computer, so as to accurate recording characteristics like fault slippage processes, site earthquake motion, and engineering structural dynamic responses. As shown in FIG. 9, the comprehensive stereoscopic monitoring systems VI comprise a variety of sensor monitoring systems, typically including laser displacement meters 7-1 (and displacement meter brackets 7-2), accelerometers 7-3, soil pressure cells 7-5, strain gauges 7-6, high-speed cameras 7-9, and others. The laser displacement meters 7-1 are placed on the pull rod systems of the model box I to monitor horizontal and vertical displacements of surfaces of the site covering layers II. The accelerometers 7-3 and soil pressure cells 7-5 are positioned in sand layer materials near the tunnels to monitor the sand layer materials. The strain gauges 7-6 are installed on arch top portions and arch bottom portions to monitor strain at the arch top portions and the arch bottom portions of the tunnels. The high-speed cameras 7-9 are located on the geotechnical centrifuge platform facing the front side of the model box I. The laser displacement meters 7-1, accelerometer 7-3, soil pressure cell 7-5, strain gauge 7-6, and high-speed camera 7-9 are all remotely connected to the computer 7-11 for communication.

Based on the present embodiment, earthquake performance research experiments of tunnel structures in near-fault sites are taken as an example to investigate the mutual interaction process between site earthquake motion responses and tunnel structures under different fault slip conditions. The specific operational procedure of the present invention is as follows:

S1. Place the model box I on the ground, and sequentially install the bottom support system V and the horizontal actuation system III into model box I to test operational performance thereof.

S2. Place fault blocks prepared with a certain inclination into simulated earthquake fault zone IV, drill holes and arrange accelerometers 7-3 and soil pressure cells 7-5 at top portions of fault bedrocks (referred to as elevation surface of acquisition system 7-7, layer 0).

S3. Install the organic glass panel 1-7, wrap gaps between the organic glass panel 1-7 and the fault blocks with rubber membranes, allowing the fault blocks to undergo centimeter-level horizontal movement.

S4. Use different materials and design methods to construct two tunnels 7-4, and paste full-bridge strain gauges on surfaces of the two tunnels to measure the strain difference between arch top portions and arch bottom portions of the two tunnels. The two tunnels here are arranged which is convenient for later data comparison.

S5. Lay standard sand to a certain depth for the site covering layers II (referred to as elevation surface of acquisition system 7-7, layers 1 and 2, as shown in FIG. 9); and place tunnel models with attached strain gauges at the same depth and relative positions within the site covering layers II, and the tunnel models cross the faults and achieve horizontal dynamic loading under the same site and fault motion conditions.

S6. Simultaneously place the accelerometers 7-3 and the soil pressure cells 7-5 layers 1 and 2 respectively, then at this point, rigidly seal both end portions of structures of the tunnels 7-4 first, and use quick-drying adhesive to attach sensors to both end portions of the tunnels 7-4.

S7. After laying the standard sand to fill the site covering layers II to reach the designed value (referred to as the elevation surface of the acquisition system 7-7, Layer 3), just install one accelerometer 7-3 and one soil pressure cell 7-5.

S8. Use the reaction bolts 1-6 to tighten the threaded pull rods 1-3, seal the model box I, and connect lifting holes 1-5 on lifting plates 1-4 with hoisting rings of a crane.

S9. Install the laser displacement meters 7-1 on a centrifuge model box to monitor vertical and horizontal displacements, hoist the centrifuge model box onto a plane of a centrifuge shaker table 7-10, install custom camera brackets 7-8, secure the high-speed cameras 7-9, and set up high-power light strips for illumination.

S10. Connect and calibrate all sensors (as shown in FIG. 8), data collectors, control devices, and the actuation control boxes 4-5.

S11. Start centrifuge static and dynamic data acquisition systems, activate the actuation control boxes 4-5, start the geotechnical centrifuge, and observe the curve of the centrifuge speed to ensure it reaches the preset value as expected.

S12. Start the experiments according to the test plan, in the main control room, use the actuation control boxes 4-5 to change the actuation direction and rate, obtain real-time data on acceleration at different elevations of site covering layers II, forces on end portions of tunnels with different materials, local deformations, ground displacements, actuator momentum and force, and monitor surface crack formation and site deformation status through panels.

S13. After completing experiments, follow requirements for centrifuge use, sequentially turn off centrifuge drive devices, oil pumps, and power switches, turn off the actuators and data acquisition systems of devices, and export multi-source monitoring data and continuous images.

S14. Remove model box I from the centrifuge and the centrifuge model box in two steps, disassemble the threaded pull rods 1-3, take photographs and preserve damage states of the two types of tunnels 7-4 in the site covering layers II, and conduct 3D scanning analysis of fracture morphology.

S15. Remove all materials and sensors. Depending on the experimental objectives, determine materials of the simulated earthquake faults IV and the site covering layers II, as well as whether to conduct dynamic response tests on coupled structures. Repeat steps S2 to S14 according to the test plan.

The detailed description above represents preferred embodiments of the present invention. However, it should be understood that various aspects, features, and concepts from patents, applications, and publications could be adopted for additional embodiments if necessary.

These and other changes can be made to the embodiments in light of the above detailed description. Generally, the terms used in the claims should not be interpreted as being limited to the specific embodiments disclosed in the specification and the claims, but rather should be understood to include all possible embodiments along with the full scope of equivalents afforded by these claims.

The invention claimed is:

1. A geotechnical centrifuge platform-based earthquake fault simulation system, comprising a model box placed on a geotechnical centrifuge platform, wherein inside the model box comprises an accommodation space, the accommodation space is provided with a bottom support system, simulated earthquake faults and site covering layers from bottom to top, and on a side of the simulated earthquake faults and the site covering layers is provided a horizontal actuation system;

the bottom support system is used to support the horizontal actuation system, and the simulated earthquake faults and the site covering layers;

the horizontal actuation system is used to apply horizontal thrusts to the simulated earthquake faults and the site covering layers;

the simulated earthquake faults are used to fill fault test blocks to simulate bedrock layers of earthquake faults; and the site covering layers are used to fill sand layer materials onto surfaces of the simulated earthquake faults to simulate soil layers of the earthquake faults.

2. The geotechnical centrifuge platform-based earthquake fault simulation system according to claim 1, wherein the model box comprises two side plates, a bottom plate and a back plate, which form a box body with a top surface remaining open, and a front side of the model box is provided with a transparent glass panel; and the top surface of the model box is detachably installed with pull rod systems, and the pull rod systems are used to hoist the model box and restrict deformation of the box body.

3. The geotechnical centrifuge platform-based earthquake fault simulation system according to claim 2, wherein in the site covering layers are provided tunnels, and the tunnels horizontally penetrate the site covering layers.

4. The geotechnical centrifuge platform-based earthquake fault simulation system according to claim 3, further comprising stereoscopic monitoring systems, wherein the stereoscopic monitoring systems comprise laser displacement meters, accelerometers, soil pressure cells and strain gauges;

the laser displacement meters are placed on the pull rod systems of the model box to monitor horizontal and vertical displacements of the site covering layers;

the accelerometers and soil pressure cells are respectively placed in the sand layer materials near the tunnels to monitor acceleration and soil pressure of the sand layer materials; and the strain gauges are placed on arch top portions and arch bottom portions of the tunnels to monitor strain of the arch top portions and the arch bottom portions of the tunnels.

5. The geotechnical centrifuge platform-based earthquake fault simulation system according to claim 3, wherein the simulated earthquake faults are in contact with one of the side plates of the model box, and between the simulated earthquake faults and the one of the side plates are arranged damping layers for shock absorption.

6. The geotechnical centrifuge platform-based earthquake fault simulation system according to claim 4, wherein the stereoscopic monitoring systems further comprise high-speed cameras; and the high-speed cameras are arranged on the geotechnical centrifuge platform and face the front side of the model box.

7. The geotechnical centrifuge platform-based earthquake fault simulation system according to claim 1, wherein the bottom support systems comprise rigid supports, elastic supports, lifter stands and motor mounts;

the rigid supports are used to support footwalls of the simulated earthquake faults;

the elastic supports are used to support hanging walls of the simulated earthquake faults;

the lifter stands are used to support screw lifting devices in the horizontal actuation system; and the motor mounts are used to support stepper motors in the horizontal actuation system.

8. The geotechnical centrifuge platform-based earthquake fault simulation system according to claim 1, wherein the horizontal actuation system comprises screw lifting devices, right-angle reducers, and stepper motors;

the screw lifting devices are used to apply horizontal thrusts to the simulated earthquake faults and the site covering layers;

the stepper motors are used to control the screw lifting devices to generate horizontal motion; and the right-angle reducers are used to decelerate screw rods rotating in the screw lifting devices.

9. The geotechnical centrifuge platform-based earthquake fault simulation system according to claim 8, wherein the screw lifting devices are horizontally provided with contact panels, loading panels, spoke sensors, flanges, screw rods, rotating shafts and lifters in sequence;

the contact panels and the loading panels are connected by bolts, the loading panels and the spoke sensors are connected by dowel pins, and the spoke sensors and the flanges are connected by bolts; and the lifters drive the rotating shafts and the screw rods to produce horizontal thrusts, and the horizontal thrusts propel the simulated earthquake faults or the site covering layers in contact with the contact panels.

10. The geotechnical centrifuge platform-based earthquake fault simulation system according to claim 9, wherein the screw lifting devices further comprise travel limiters, and the travel limiters are arranged on surfaces of the lifters facing the flanges.

* * * * *